US011945224B2

(12) United States Patent
Pan

(10) Patent No.: US 11,945,224 B2
(45) Date of Patent: Apr. 2, 2024

(54) INKJET PRINTING DEVICE INCLUDING CIRCULATION ASSEMBLY

(71) Applicant: TCL CHINA STAR OPTOELECTRONICS TECHNOLOGY CO., LTD., Shenzhen (CN)

(72) Inventor: Hongying Pan, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 326 days.

(21) Appl. No.: 17/435,220

(22) PCT Filed: Jul. 9, 2021

(86) PCT No.: PCT/CN2021/105460
§ 371 (c)(1),
(2) Date: Aug. 31, 2021

(87) PCT Pub. No.: WO2023/272774
PCT Pub. Date: Jan. 5, 2023

(65) Prior Publication Data

US 2023/0211609 A1 Jul. 6, 2023

(30) Foreign Application Priority Data

Jun. 29, 2021 (CN) ......................... 202110727743.9

(51) Int. Cl.
*B41J 2/165* (2006.01)

(52) U.S. Cl.
CPC ....... *B41J 2/16552* (2013.01); *B41J 2/16523* (2013.01); *B41J 2002/16594* (2013.01)

(58) Field of Classification Search
CPC ................ B41J 2/16552; B41J 2/16523; B41J 2002/16594; B41J 2/175; B41J 3/4073; B41J 2/01; H10K 71/00; H10K 71/135
See application file for complete search history.

(56) References Cited

U.S. PATENT DOCUMENTS

2019/0016141 A1 1/2019 Kitamura et al.

FOREIGN PATENT DOCUMENTS

CN 102490473 A * 6/2012 .......... B41J 2/16523
CN 102490473 A 6/2012
CN 103342049 A 10/2013
CN 104924766 A 9/2015
CN 106985556 A 7/2017
CN 107264039 A 10/2017
CN 107265537 A 10/2017
CN 207893394 U 9/2018
(Continued)

*Primary Examiner* — Bradley W Thies
(74) *Attorney, Agent, or Firm* — The Roy Gross Law Firm, LLC; Roy Gross

(57) ABSTRACT

The present application provides an inkjet printing device, which includes a print head, a first container, a first pipeline, and a first valve. The print head is configured to discharge printing material. The first container is configured to store a solvent for cleaning the print head. An input end of the first pipeline is in communication with the first container, and an output end of the first pipeline is in communication with the print head. The first valve is provided on the first pipeline.

13 Claims, 5 Drawing Sheets

(56) References Cited

FOREIGN PATENT DOCUMENTS

| | | | | | |
|---|---|---|---|---|---|
| CN | 208812749 | U | | 5/2019 | |
| CN | 110271295 | A | | 9/2019 | |
| CN | 110356115 | A | | 10/2019 | |
| CN | 111376589 | A | * | 7/2020 | ................ B41J 2/01 |
| CN | 111376589 | A | | 7/2020 | |
| KR | 20170084814 | A | | 7/2017 | |

* cited by examiner

INKJET PRINTING DEVICE INCLUDING CIRCULATION ASSEMBLY

CROSS REFERENCE TO RELATED APPLICATIONS

This application is a National Phase of PCT Patent Application No. PCT/CN2021/105460 having International filing date of Jul. 9, 2021, which claims the benefit of priority of Chinese Patent Application No. 202110727743.9, filed Jun. 29, 2021, the contents of which are all incorporated herein by reference in their entirety.

FIELD OF INVENTION

The present application relates to a field of printing technology, in particular to an inkjet printing device.

BACKGROUND OF INVENTION

Organic light-emitting diodes (OLEDs) have advantages of being all solid-state, ultra-thin, no viewing angles limitation, fast response times, room temperature operation available, easy realization of flexible display and 3D display, etc. They are recognized as mainstream technology of next-generation displays. A current development trend of the OLEDs is towards a direction of inkjet printing. When printing, some printing nozzles to be used need to be hung on a printing device. However, it is necessary to ensure that the printing nozzle is wet to prevent a solvent in the printing material near an end of the printing nozzle from evaporating for a long time, thus drying the printing material and causing the printing nozzle to be blocked.

Technical Problem

A current method of preventing nozzle clogging in inkjet printing is to use an auto spitting technique, which performs static inkjet every 2 seconds to prevent excessive volatilization of the solvent in the printing material from causing clogging. However, this method needs continuous inkjet when the inkjet printing device is in a non-working state, which will result in a waste of the printing material.

SUMMARY OF INVENTION

The present application provides an inkjet printing device to solve the technical problem that current method of preventing the nozzle of the print head from clogging will cause the waste of printing material.

The present application provides an inkjet printing device, which includes: a print head configured to discharge printing material; a first container configured to store a solvent for cleaning the print head; a first pipeline, wherein an input end of the first pipeline is in communication with the first container, and an output end of the first pipeline is in communication with the print head; and a first valve, wherein the first valve is provided on the first pipeline.

Optionally, in some embodiments of the present application, the inkjet printing device further includes a second container, a second pipeline, and a second valve.

The second container is configured to store the printing material, an input end of the second pipeline is in communication with the second container, and an output end of the second pipeline is in communication with the print head, and the second valve is provided on the second pipeline. The second valve is configured to disconnect the second pipeline when the inkjet printing device is in a non-working state and to conduct the second pipeline when the inkjet printing device is in a working state.

Optionally, in some embodiments of the present application, the inkjet printing device has a working state and a non-working state.

In the working state, the first valve is closed and the second valve is open, and in the non-working state, the first valve is open and the second valve is closed.

Optionally, in some embodiments of the present application, the output end of the first pipeline is in communication with a part of the second pipeline located between one of the second valve and the print head.

Optionally, in some embodiments of the present application, the first container and the second container are arranged side by side.

Optionally, in some embodiments of the present application, the inkjet printing device further includes a circulation assembly, the circulation assembly is configured to receive a waste liquid flowing out from one of the print head and to output the solvent and/or the printing material.

Optionally, in some embodiments of the present application, the circulation assembly comprise a collection container for receiving the waste liquid.

Optionally, in some embodiments of the present application, the print head is configured to print one type of the printing material, and the collection container is arranged corresponding to the print head that print a same type of printing material.

Optionally, in some embodiments of the present application, the circulation assembly comprises a third container, a third pipeline, a third valve, and a fourth pipeline.

An input end of the third pipeline is configured to receive the waste liquid, and an output end of the third pipeline is in communication with the third container; the third valve is provided on the third pipeline; the third container is arranged below the first container, and the third container is configured to store the waste liquid and to evaporate the solvent in the waste liquid, and an input end of the fourth pipeline is in communication with the third container, and an output end of the fourth pipeline is in communication with the first container.

Optionally, in some embodiments of the present application, the fourth pipeline includes an input section and an output section.

The circulation assembly further includes a heating element and a condensing element, the heating element is arranged in the input section, and the circulation assembly further includes a condensing element arranged in the output section.

Optionally, in some embodiments of the present application, the circulation assembly further includes a fourth container, a fifth pipeline, and a fourth valve.

The fifth pipeline is in communication with the third container and the fourth container, the fourth valve is provided on the fifth pipeline, the fourth container is arranged below the third container, and the fourth container is configured to store the waste liquid after evaporating the solvent.

Optionally, in some embodiments of the present application, the inkjet printing device further includes a control unit.

The control unit is respectively connected to the first valve, the second valve, and the fourth valve, and is configured to control the opening or closing of the first valve, the second valve, and the fourth valve, respectively.

Alternately, the control unit is respectively connected to the first valve, the second valve, the third valve, and the fourth valve, and is configured to control the opening or closing of the first valve, the second valve, the third valve, and the fourth valve, respectively.

Optionally, in some embodiments of the present application, the inkjet printing device further includes a viscosity sensor provided on an inner sidewall or a bottom wall of the third container, and the viscosity sensor is connected to the control unit.

The viscosity sensor is configured to obtain a viscosity value of a solution in the third container, and the control unit is configured to control the opening or closing of the fourth valve according to the viscosity value.

Optionally, in some embodiments of the present application, the circulation assembly further includes a collection container for receiving the waste liquid, and the collection container is connected to the input end of the third pipeline.

Optionally, in some embodiments of the present application, the fourth pipeline includes an input section and an output section.

The circulation assembly further includes a heating element, and the heating element is provided in the input section.

Optionally, in some embodiments of the present application, the circulation assembly further includes a condensing element, and the condensing element is provided in the output section.

Optionally, in some embodiments of the present application, the circulation assembly further includes a fourth container, a fifth pipeline, and a fourth valve.

The fifth pipeline is in communication with the third container and the fourth container, the fourth valve is provided on the fifth pipeline, the fourth container is arranged below the third container, and the fourth container is configured to store the waste liquid after evaporating the solvent.

Optionally, in some embodiments of the present application, the inkjet printing device further includes a control unit.

The control unit is respectively connected to the first valve, the second valve, and the fourth valve, and is configured to control the opening or the closing of the first valve, the second valve, and the fourth valve, respectively.

Or the control unit is respectively connected to the first valve, the second valve, the third valve, and the fourth valve, and is configured to control the opening or closing of the first valve, the second valve, the third valve, and the fourth valve, respectively.

Optionally, in some embodiments of the present application, the inkjet printing device further includes a viscosity sensor. The viscosity sensor is provided on an inner sidewall or a bottom wall of the third container, and the viscosity sensor is connected to the control unit.

The viscosity sensor is configured to obtain a viscosity value of a solution in the third container, and the control unit is configured to control the opening or closing of the fourth valve according to the viscosity value.

Optionally, in some embodiments of the present application, the solvent is the same as a solvent in the printing material.

Beneficial Effect

The present application provides an inkjet printing device, which includes a print head, a first container, a first pipeline, and a first valve, wherein the print head is configured to release printing material, and the first container is configured to store a solvent for cleaning the print head. An input end of the first pipeline is in communication with the first container, and an output end of the first pipeline is in communication with the print head. The first valve is provided on the first pipeline. In the present application, the first container, the first pipeline, and the first valve are additionally provided to the inkjet printing device. When the inkjet printing device is in a non-working state, the first valve is opened to conduct the first pipeline. Then, using solvent to clean the nozzle of the print head can prevent the nozzle of the print head from clogging. Meanwhile, compared with the prior art that needs to perform continuous inkjet when the inkjet printing device is in a non-working state, the inkjet printing device provided in the present application can prevent the waste of printing material.

DESCRIPTION OF DRAWINGS

In order to explain the embodiments or the technical solutions in the prior art more clearly, following will briefly introduce the drawings that need to be used in the description of the embodiments or the prior art. Obviously, the drawings in the description are only some embodiments of the invention. For those of ordinary skill in the art, other drawings can be obtained based on these drawings without creative work.

DETAILED DESCRIPTION OF PREFERRED EMBODIMENTS

Figure 1:
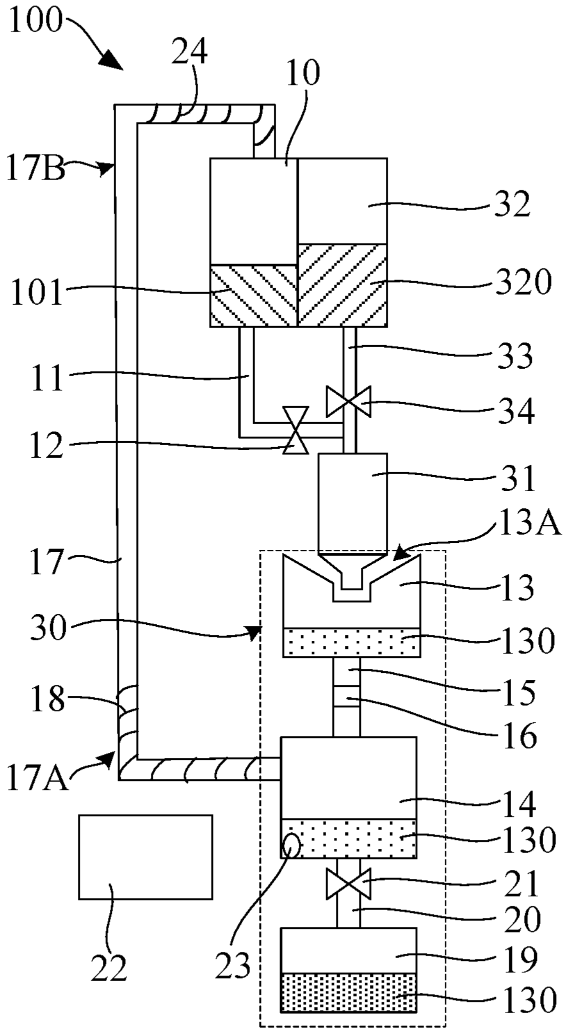
FIG. 1 is a schematic diagram of a first structure of an inkjet printing device provided by the present application.

The following will clearly and completely describe the technical solutions in the embodiments of the present application with reference to the drawings in the embodiments of the present application. Obviously, the embodiments are only a part of the embodiments of the present application, rather than all the embodiments. Based on these embodiments, all other embodiments obtained by those skilled in the art without creative work shall fall within the protection scope of this application. In addition, it should be understood that the specific implementations described herein are only used to illustrate and explain the application, and are not used to limit the application. In this application, if no explanation is made to the contrary, the orientation terms such as "upper", "lower", "left", "right" usually refer to the upper, lower, left and right of the device in actual use or working state. Specifically, the orientation of the device in the drawings.

The present application provides an inkjet printing device, which will be described in detail below. It should be noted that the description order of the following embodiments is not intended to limit the preferred order of the embodiments of the present application. In the following embodiments, the description of each embodiment has its own focus. For parts that are not described in detail in a certain embodiment, reference may be made to related descriptions of other embodiments.

Please refer to FIG. 1, which is a schematic diagram of a first structure of the inkjet printing device provided by the present application. In the present application, the inkjet printing device 100 includes a print head 31, a first container 10, a first pipeline 11, and a first valve 12. The print head 31 is configured to discharge the printing material 320. The first container 10 is configured to store a solvent 101 for cleaning the print head 31. The input end of the first pipeline 11 is in communication with the first container 10. The output end of the first pipeline 11 is in communication with the print head 31. The first valve 12 is provided on the first pipeline 11.

Wherein, the top of the first container 10 can be defined with an opening and provided with a cover (not shown in the figure). The cover is used to close the opening and further seal the first container 10. When there is not much solvent 101 left in the first container 10, the cover can be opened, and the solvent 101 can be added into the first container 10 through the opening. The first container 10 can be made of a transparent and corrosion-resistant material to facilitate observation of the remaining amount of the solvent 101 in the first container 10.

Wherein, the first pipeline 11 can be arranged below the first container 10 and between the first container 10 and the print head 31. This arrangement utilizes the effect of gravity to make the solvent 101 smoothly flow into the print head 31 from the first container 10. However, the present application is not limited to this. For example, the first pipeline 11 may also be arranged above the first container 10 or arranged flush with the first container 10. In this regard, air pressure can be applied to the first container 10 through an air pump or the like to realize the flow of the solvent 101, which will not be described herein.

Wherein, the inkjet printing device 100 includes a plurality of print heads 31. The print head 31 includes a plurality of nozzles. The print head 31 discharges the printing material 320 through the plurality of nozzles to perform printing on the device to be printed. Generally, each print head 31 prints a type of printing material 320 correspondingly.

For example, when the inkjet printing device 100 is used to print the light-emitting layer of the display device, the printing material 320 may be a red light-emitting material, a green light-emitting material, a blue light-emitting material, or the like. Each print head 31 only prints one type of printing material 320 to prevent color mixing and improve the printing effect.

Certainly, the inkjet printing device 100 provided in this application can also be used to print organic layers in a display device, etc., which is not specifically limited in the present application.

Wherein the printing material 320 is usually ink. Specifically, the printing material 320 may be ultraviolet (UV) ink, solvent-based ink, or water-based ink. UV ink can be irradiated with UV light to cause a chemical reaction, and then achieve the effect of curing. Solvent-based inks use non-water-soluble organic solvents as the main component to dissolve the colorant. The colorant herein can be either a pigment or a dye. The water-based ink is based on inorganic solvent water as the main carrier.

Wherein, the solvent 101 can be an organic solvent. Organic solvents are volatile, which can unclog the nozzle of the print head 31 faster and keep the print head 31 dry and tidy. For example, the solvent 101 can be selected from one or more of triethylene glycol, dimethyl ether, diethylene glycol, 2-benzyloxyethanol, triethylene glycol butyl methyl ether, butyl benzoate, dimethyl phthalate, ethanol, N-N-dimethylformamide, or a combination thereof. Certainly, in the present application, if the printing material 320 is an aqueous ink, the solvent 101 can also be water. When the solvent 101 is water, the cost is less and the erosion to print head 31 can be reduced.

It should be noted that when the printing material 320 is a solvent-based ink, the printing material 320 includes an organic solvent. The solvent 101 of the present application can be the same as the organic solvent in the printing material 320 to better dissolve and clean the remaining printing material 320 in the print head 31. Certainly, the solvent 101 can also be different from the organic solvent of the printing material 320, which is not specifically limited in the present application.

Wherein, the first pipeline 11 can be fixedly connected with the print head 31. The first pipeline 11 can also be detachably connected to the print head 31 through a buckle, a thread, or the like. The material of the first pipeline 11 can be set according to the type of the printing material 320. For example, the first pipeline 11 can be made of corrosion-resistant materials such as epoxy resin, polytetrafluoroethylene, fluororubber, or perfluorotriazine rubber. As a result, the service life of the first pipeline 11 is increased.

Wherein, the first valve 12 can be a manual valve, an electromagnetic valve, or a pneumatic valve. Similarly, the material of the first valve 12 can be set according to the type of the solvent 101. For example, the first valve 12 can be made of corrosion-resistant materials such as epoxy resin, polytetrafluoroethylene, fluorine rubber, or perfluorotriazine rubber. As a result, the service life of the first valve 12 is increased.

Wherein, one first container 10 communicates with at least one print head 31. For example, the first containers 10 can communicate with the print heads 31 in a one-to-one correspondence. In this situation, each first container 10 and the corresponding print head 31 are communicated with each other through a first pipeline 11. For another example, each first container 10 can be configured to provide a solvent 101 for a plurality of print heads 31. That is, one first container 10 communicates with the plurality of print heads 31 through a plurality of first pipes 11, respectively.

It can be understood that the inkjet printing device 100 has a non-working state and a working state. In the non-working state, the inkjet printing device 100 stops inkjet printing, and the print head 31 no longer releases the printing material 320. In this situation, the first valve 12 is opened, and the first pipeline 11 is conducted. The solvent 101 flows out from the first container 10 and then flows into the print head 31 through the first pipe 11 to clean the print head 31 and prevent the nozzles of the print head 31 from clogging. In the working state, the print head 31 releases the printing material 320 to perform inkjet printing on the device to be printed. In this situation, the first valve 12 is closed, and the first pipeline 11 is disconnected to prevent the solvent 101 from flowing into the print head 31 and affect the inkjet printing effect.

The present application provides an inkjet printing device 100. The inkjet printing device 100 includes a print head 31, a first container 10, a first pipeline 11, and a first valve 12. In the present application, the first container 10, the first pipeline 11, and the first valve 12 are additionally provided to the inkjet printing device 100. When the inkjet printing device 100 is in a non-working state, the first valve 12 is opened to conduct the first pipeline 11. The solvent 101 flows into the print head 31 through the first pipe 11 to clean the nozzle of the print head 31, which can prevent the nozzle of the print head 31 from clogging and increase the utilization rate of the print head 31. Meanwhile, compared to the continuous inkjet method when the inkjet printing device 100 is in a non-working state, the present application can avoid the waste of the printing material 320 and prevent the ink leakage that may cause corrosion to the inkjet printing device 100 during continuous inkjet.

In addition, the present application uses the solvent 101 to clean the nozzle of the print head 31, and the solvent 101 can dissolve the printing material 320 remaining in the print head 31. Therefore, it is easier to clean off the remaining printing material 320. Furthermore, there is no residual printing material 320 in the print head 31 after cleaning with the solvent 101. Therefore, when the inkjet printing device 100 is in a non-working state, the first valve 12 does not need to be kept open all the time. That is, there is no need to use solvent 101 to perform cleaning all the time or intermittently so that the amount of the solvent 101 can be reduced, and resources can be further saved.

In the present application, the inkjet printing device 100 further includes a second container 32, a second pipeline 33, and a second valve 34.

Specifically, the second container 32 is disposed above the print head 31. The second container 32 is configured to store the printing material 320. The input end of the second pipeline 33 communicates with the second container 32. The output end of the second pipeline 33 communicates with the print head 31. The second valve 34 is provided on the second pipeline 33.

Wherein, the second valve 34 is configured to conduct or disconnect the second pipeline 33. Specifically, the second valve 34 is configured to close when the inkjet printing device 100 is in a non-working state, so as to disconnect the second pipeline 33 so that the printing material 320 cannot flow into the print head 31 from the second container 32. The second valve 34 is also configured to open when the inkjet printing device 100 is in a working state to conduct the second pipeline 33 so that the printing material 320 flows from the second container 32 into the print head 31 for inkjet printing.

Wherein, the second container 32 used in the present application is a split-second container, that is, the second container 32 and the print head 31 are provided separately. This design allows the print head 31 to continue to be used when the second container 32 is invalid. Meanwhile, the process of disassembling and assembling the second container 32 by the user is simplified, and the chance of man-made damage to the inkjet printing device 100 is reduced.

Wherein, the second valve 34 can be a manual valve, an electromagnetic valve, or a pneumatic valve.

Wherein, the materials of the second pipeline 33 and the second valve 34 can be set according to the type of the printing material 320. For example, the second pipeline 33 and the second valve 34 can be made of corrosion-resistant materials such as epoxy resin, polytetrafluoroethylene, fluororubber, or perfluorotriazine rubber. As a result, the service life of the second pipeline 33 and the second valve 34 is increased.

It should be noted that when the inkjet printing device 100 is in a non-working state, the second valve 34 is closed and the second pipeline 33 is disconnected. The inkjet printing device 100 stops inkjet printing, and the print head 31 no longer releases the printing material 320. Meanwhile, the first valve 12 is opened, the first pipeline 11 is conducted, and the solvent 101 flows into the print head 31 through the first pipeline 11 to realize the cleaning of the print head 31. When the inkjet printing device 100 is in the working state, the second valve 34 is opened, and the second pipeline 33 is conducted. The printing material 320 flows into the print head 31 from the second container 32. The nozzle of the print head 31 releases the printing material 320 to perform inkjet printing on the device to be printed. Meanwhile, the first valve 12 is closed and the first pipeline 11 is disconnected to prevent the solvent 101 from flowing into the print head 31 from the first container 10, which will affect the inkjet printing effect.

Optionally, in the present application, the output end of the first pipeline 11 communicates with the part of the second pipeline 33 between the second valve 34 and the print head 31.

It can be understood that the first pipeline 11 communicates with the second pipeline 33 and further communicates with the print head 31, and it is not necessary to form a connection hole on the print head 31. In addition, the first pipeline 11 is connected to the second pipeline 33, and the cleaning can be started from the output end of the second pipeline 33 with solvent. While preventing the nozzle of the print head 31 from being clogged, it also plays a role in cleaning the second pipe 33. This prevents excessive printing material 320 remain in the second pipeline 33 from affecting the next inkjet printing.

In addition, when the first pipeline 11 and the second pipeline 33 are connected, the first pipeline 11 and the second pipeline 33 can be integrally formed, thereby simplifying the manufacturing process. Certainly, if the diameters of the first pipe 11 and the second pipe 33 are small and it is inconvenient to realize the communication between the two, the first pipe 11 and the print head 31 can also be communicated.

In the present application, each first container 10 and at least one second container 32 are arranged side by side. That is, the first container 10 and the second container 32 are fixed or detachably connected to each other by bonding, snapping, or the like. For example, the first container 10 and the second container 32 can be provided in a one-to-one correspondence. Each first container 10 can also be provided side by side with at least two second containers 32, which is not specifically limited in the present application.

In the present application, the first container 10 and the second container 32 are provided side by side, and the first pipeline 11 can be configured to directly connect the first container 10 and the print head 31. This reduces the repeated connection and separation between the first pipeline 11 and the print head 31.

Optionally, in the present application, the first container 10 and the first pipeline 11 can be provided separately from the print head 31 and the second container 32.

Specifically, when the inkjet printing device 100 is in a working state, the inkjet printing device 100 controls the second container 32, the second pipeline 33, and the print head 31 to move to the corresponding printing area, and inkjet printing is performed on the device to be printed.

When the inkjet printing device 100 is in a non-working state, the inkjet printing device 100 moves the print head 31 and the second container 32 to communicate with the first container 10 and the first pipeline 11 for cleaning. Wherein, the first pipeline 11 and the print head 31 can be connected by snap-fitting, etc., which is not specifically limited in the present application.

It can be understood that the first container 10 and the first pipeline 11 have a certain weight, which will cause certain restrictions on the movement of the second container 32 and the print head 31. In this embodiment, the first container 10 and the first pipeline 11 are separated from the print head 31 and the second container 32. During printing, the load on the second container 32 and the print head 31 can be reduced, and the stability of inkjet printing can be improved.

In the present application, the inkjet printing device 100 further includes a circulation assembly 30. The circulation assembly 30 is configured to receive the waste liquid 130 flowing out from the print head 31. The waste liquid 130 includes a solvent 101 and a printing material 320. The circulation assembly 30 is also configured to output the solvent 101 and/or the printing material 320.

It can be understood that after the solvent 101 is used to clean the print head 31, the solvent 101 dissolves the printing material 320 remaining in the print head. It can be understood that after cleaning the print head 31 with a solvent 101, the solvent 101 dissolves the printing material 320 remaining in the print head 31. Therefore, the waste liquid 130 flowing out from the print head 31 includes the solvent 101 and the printing material 320. The circulation assembly 30 collects the waste liquid 130. Then, the solvent 101 and/or the printing material 320 can be recovered through heat treatment, filtration treatment, etc., so as to realize the recycling of resources.

Specifically, circulation assembly 30 includes a collection container 13. The collection container 13 is configured to receive the waste liquid 130 flowing out from the print head 31. The waste liquid 130 includes a solvent 101 and a printing material 320.

Wherein, the collection container 13 is defined with an opening 13A on the side close to the first container 10. When the inkjet printing device 100 is in a non-working state, the print head 31 corresponds to the opening 13A to facilitate the waste liquid 130 flowing out from the print head 31 flows into the collection container 13.

In the present application, a collection container 13 is provided to collect the waste liquid 130 flowing out from the print head 31. In this way, it is possible to prevent the waste liquid 130 from leaking out, causing pollution or erosion to the inkjet printing device 100. Meanwhile, the waste liquid 130 in the collection container 13 can be recycled to improve resource utilization. In addition, the print head 31 can also be engaged with the opening 13A to prevent the solvent 101 in the waste liquid 130 from volatilizing into the air and causing pollution.

In the present application, the circulation assembly 30 further includes a third container 14, a third pipeline 15, a third valve 16, and a fourth pipeline 17.

Specifically, the output end of the third pipeline 15 is in communication with the third container 14. The third valve 16 is provided on the third pipeline 15. The third valve 16 is configured to control the conduction or disconnection of the third pipeline 15. The third container 14 is arranged below the collection container 13. The third container 14 is configured to store the waste liquid 130 flowing out from the collection container 13 and to evaporate the solvent 101 in the waste liquid 130. The input end of the third pipeline 15 is in communication with the collection container 13. The input end of the fourth pipeline 17 is in communication with the third container 14. The output end of the fourth pipeline 17 is in communication with the first container 10.

Wherein, the third container 14 can be a distillation box, such as an atmospheric distillation box, a vacuum distillation box, or the like. The working principle of the distillation box is to use the difference in the volatility of the components in the liquid mixture to partially vaporize the liquid mixture and then partially condense the vapor, thereby achieving the separation of the components contained in the distillation box. In addition, the third container 14 is configured to heat and distill the waste liquid 130 therein, so that the solvent 101 can be evaporated from the waste liquid 130.

Wherein, the input end of the fourth pipeline 17 can be communicated with the end of the third container 14 close to the collection container 13 to facilitate the removal of the evaporated solvent 101. The output end of the fourth pipeline 17 is communicated with the top end of the first container 10 to prevent the solvent 101 in the first container 10 from flowing back into the third container 14 through the fourth pipeline 17.

Wherein, the materials of the third pipeline 15 and the fourth pipeline 17 can be set according to the type of the printing material 320 and the solvent 101. For example, the third pipeline 15 and the fourth pipeline 17 can be made of corrosion-resistant materials such as epoxy resin, polytetrafluoroethylene, fluororubber, or perfluorotriazine rubber, or the like. As a result, the service life of the third pipeline 15 and the fourth pipeline 17 is increased.

Wherein, the third valve 16 can be a reverse flow valve, or a control valve such as a manual valve, an electromagnetic valve, or a pneumatic valve. The reverse flow valve is also called as a one-way valve, which is automatically opened and closed by the force generated by the flow of the medium itself in the pipeline, and it is a kind of automatic valve. That is, when the third valve 16 is a reverse flow valve, the waste liquid 130 can flow into the third container 14 from the collection container 13 but cannot flow into the collection container 13 from the third container 14. Thus, when the solvent 101 is evaporated in the third container 14, it can be prevented from being introduced into the collection container 13 in the reverse direction. When the third valve 16 is a control valve, it is opened when cleaning the print head 31. When the solvent 101 is evaporated in the third container 14, the third valve 16 is closed.

In the present application, the third container 14, the third pipeline 15, the third valve 16, and the fourth pipeline 17 are provided in the inkjet printing device 100. The waste liquid 130 in the third container 14 can be distilled so that the solvent 101 evaporates from the third container 14 and enters the first container 10 again. In this way, the recycling of the solvent 101 is realized and the cost is reduced.

In the present application, the fourth pipeline 17 includes an input section 17A and an output section 17B. The input section 17A is the part of the fourth pipeline 17 close to the third container 14. The output section 17B is the part of the fourth pipeline 17 close to the first container 10. The circulation assembly 30 further includes a heating element 18. The heating element 18 is provided in the input section 17A. Specifically, the heating element 18 can be arranged on the outer sidewall of the input section 17A of the fourth pipeline 17. The heating element 18 can be a heating wire. The temperature of the heating element 18 can be adjusted according to the boiling point of the solvent 101, so that the solvent 101 maintains in a gas state in the input section 17A of the fourth pipeline 17.

In the present application, the heating element 18 is provided in the input section 17A of the fourth pipeline 17 to heat the fourth pipeline 17 so that the solvent 101 entering the fourth pipeline 17 maintains a gas state. The evaporated solvent 101 is prevented from condensing during the transportation in the fourth pipeline 17 to form liquid adhesion. Meanwhile, it further prevents the evaporated solvent 101 from being liquefied and flowing back to the third container 14 when it is cold. As a result, the recovery rate of the solvent 101 can be improved.

Further, the circulation assembly 30 further includes a condensing element 24. The condensing element 24 is arranged in the output section 17B of the fourth pipeline 17. Specifically, the condensing element 24 can be a condenser tube wound on the outer sidewall of the output section 17B. There is flowing cold water in the condenser tube. That is, the cooling of the output section 17B is realized by adopting a water-cooling method, which accelerates the cooling and condensation of the gaseous solvent 101 so that the solvent 101 flows into the first container 10 smoothly. Certainly, if the condensing element 24 is not provided, It also can increase the length of the output section 17B of the fourth pipeline 17 so that the gaseous solvent 101 is sufficiently cooled and condensed at the output end of the fourth pipeline 17.

In the present application, the circulation assembly 30 further includes a fourth container 19, a fifth pipeline 20, and a fourth valve 21.

Specifically, the input end of the fifth pipeline 20 is in communication with the third container 14, and the output end of the fifth pipeline 20 is in communication with the fourth container 19. The fourth valve 21 is provided on the fifth pipeline 20. The fourth valve 21 is configured to control the conduction or disconnection of the fifth pipeline 20. The fourth container 19 is arranged below the third container 14. The fourth container 19 is configured to store the waste liquid 130 flowing out from the third container 14 after evaporating the solvent 101.

Wherein, the materials of the fifth pipeline 20 and the fourth valve 21 can be set according to the type of the printing material 320. For example, the fifth pipeline 20 and the fourth valve 21 can be made of corrosion-resistant materials such as epoxy resin, polytetrafluoroethylene, fluororubber, or perfluorotriazine rubber. Therefore, the service life of the fifth pipeline 20 and the fourth valve 21 is increased.

Wherein, the fourth valve 21 is configured to close when the third container 14 is performing the distillation process to disconnect the fifth pipeline 20 to prevent the waste liquid 130 from flowing into the fourth container 19. The fourth valve 21 is further configured to open when the distillation process of the third container 14 is completed, to conduct the fifth pipeline 20. In this situation, the waste liquid 130 after evaporating the solvent 101 flows into the fourth container 19 from the third container 14.

It can be understood that the waste liquid 130 includes the printing material 320 remaining in the print head 31 and the solvent 101 configured to clean the print head 31. Therefore, after the waste liquid 130 is distilled in the third container 14, the solvent 101 evaporates, and the remaining is basically the printing material 320. Therefore, in the present application, the fourth container 19 is provided to store the waste liquid 130 after the distillation process, which can realize the recycling of the printing material 320 and reduce the cost.

In the present application, the first valve 12, the second valve 34, the third valve 16, and the fourth valve 21 can be opened or closed manually or by software according to the working process of the inkjet printing device 100.

For example, in the present application, the inkjet printing device 100 further includes a control unit 22. The control unit 22 is connected to the first valve 12, the second valve 34, and the fourth valve 21, respectively. The control unit 22 is configured to control the opening or closing of the first valve 12, the second valve 34, and the fourth valve 21, respectively so that the inkjet printing device 100 can operate normally in each stage.

Optionally, when the third valve 16 is a control valve, the control unit 22 can be connected to the first valve 12, the second valve 34, the third valve 16, and the fourth valve 21, respectively. The control unit 22 is configured to control the opening or closing of the first valve 12, the second valve 34, the fourth valve 21, and the third valve 16 respectively according to the set program, to make the inkjet printing apparatus 100 operate normally in each stage.

In the present application, the inkjet printing device 100 further includes a viscosity sensor 23. The viscosity sensor 23 is arranged on the inner sidewall or the bottom wall of the third container 14. The viscosity sensor 23 is connected to the control unit 22. The viscosity sensor 23 is configured to obtain the viscosity value of the waste liquid 130 in the third container 14. The control unit 22 is configured to control the opening or closing of the fourth valve 21 according to the viscosity value.

It can be understood that the printing materials used in the inkjet printing device 100 all have a certain viscosity value. Evaporating the solvent 101 of the waste liquid 130 in the third container 14 will continuously increase the concentration of the waste liquid 130. In the present application, the viscosity sensor 23 is provided in the third container 14 to monitor the viscosity of the waste liquid 130 in real-time and transmit the detection result to the control unit 22. When the viscosity value of the waste liquid 130 is greater than or equal to the preset viscosity value, the control unit 22 controls the fourth valve 21 to open, and the distilled waste liquid 130 flows into the fourth container 19 for recycling. Wherein, the preset viscosity value can be set according to the viscosity of the printing material 320.

In the above embodiments of the present application, each print head 31 corresponds to a collection container 13, a third container 14, and a fourth container 19. However, the present application is not limited to this.

Figure 2:
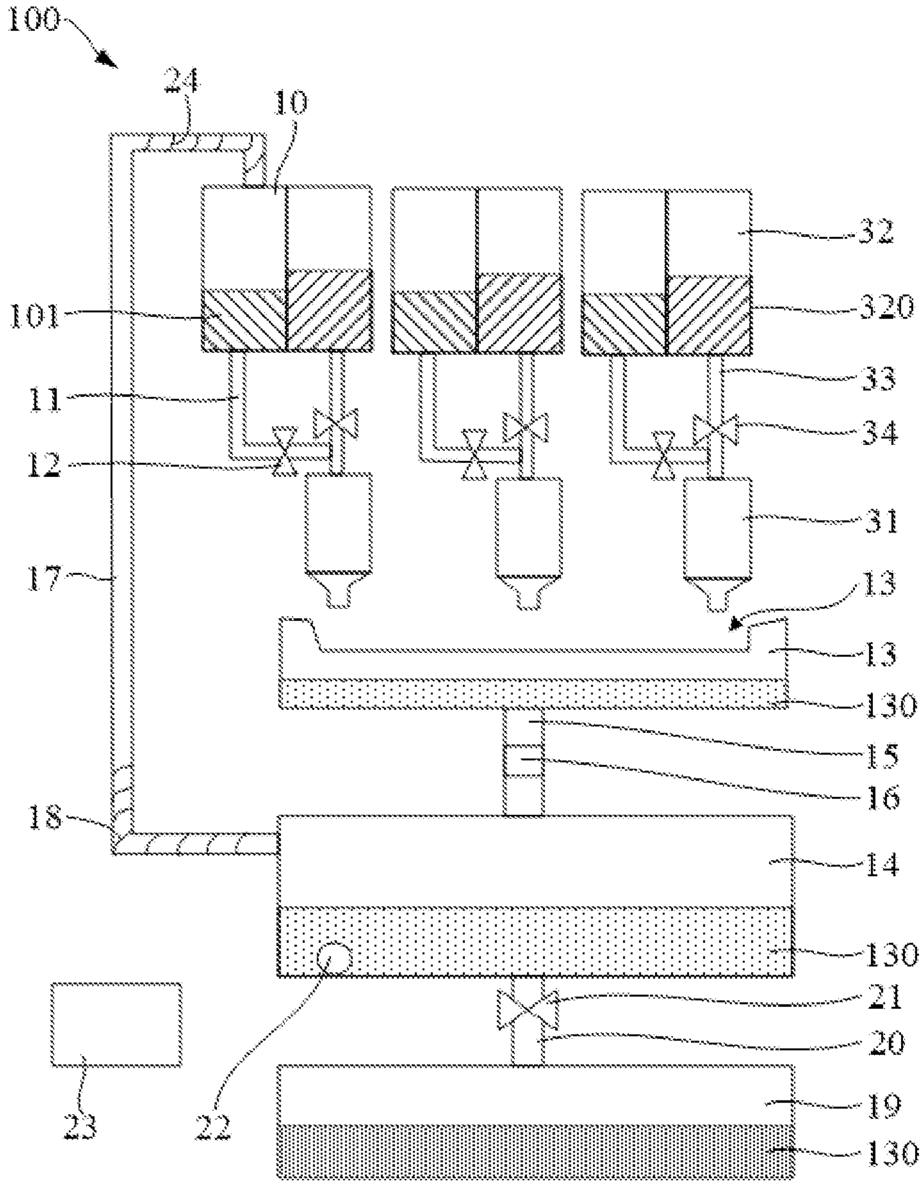
FIG. 2 is a schematic diagram of a second structure of the inkjet printing device provided by the present application.

For example, please refer to FIG. 2, which is a second schematic diagram of the inkjet printing device provided by the present application. The inkjet printing device 100 of this embodiment is different from the inkjet printing device 100 of any of the above embodiments in that each collection container 13 is provided corresponding to a plurality of print heads 31.

Specifically, each collection container 13 can be set corresponding to 2, 3, 4, or more print heads 31. Correspondingly, a third container 14 and a fourth container 19 are provided for each collection container 13. This arrangement can effectively simplify the structure of the inkjet printing device 100. Meanwhile, by reducing the number of the collection containers 13, the third containers 14, and the fourth containers 19, the number of the third pipeline 15, the third valve 16, the fourth pipeline 17, the fifth pipeline 20, and the fourth valve 21 can be reduced, thereby saving costs.

Furthermore, it can be seen from the above-mentioned embodiment that each print head 31 prints a corresponding printing material 320. Then, each collection container 13 is corresponding to at least one print head 31 that prints the same type of printing material 320. Therefore, when the printing material 320 is recycled, the printing material 320 can be prevented from color mixing, and the recycling rate can be improved.

Figure 3:
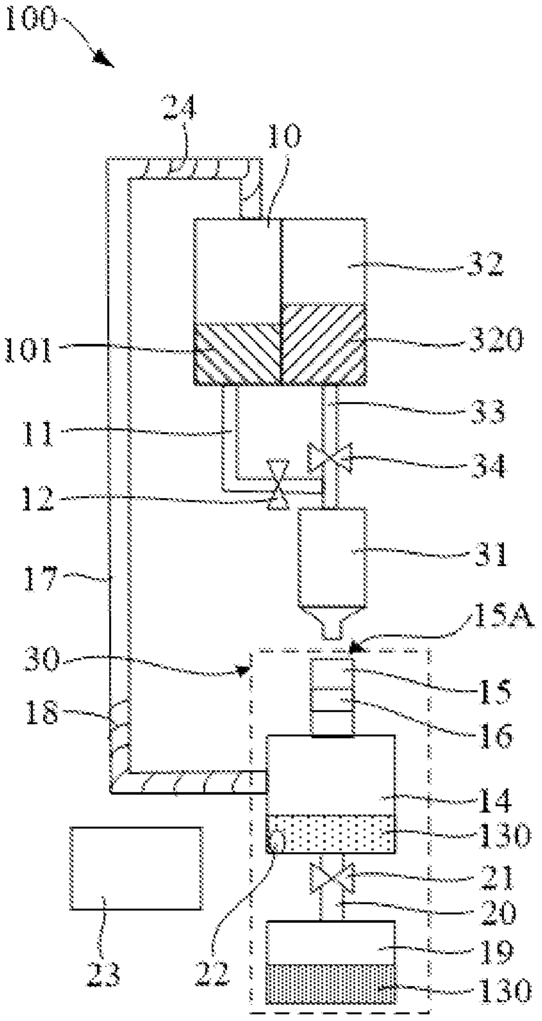
FIG. 3 is a schematic diagram of a third structure of the inkjet printing device provided by the present application.

Please refer to FIG. 3, which is a schematic diagram of a third structure of the inkjet printing device provided by the present application. The difference between the inkjet printing device 100 provided in this embodiment and the inkjet printing device 100 in any of the foregoing embodiments is that the circulation assembly 30 does not include the collection container 13.

Specifically, the third pipeline 15 is close to port 15A of the first container 10 for receiving the waste liquid 130 flowing out from the print head 31, and then the waste liquid 130 flows into the fourth container 19. Compared with FIG. 1, the pipe diameter of the third pipeline 15 in this embodiment can be increased, so that the waste liquid 130 smoothly flows into the fourth container 19 through the third pipeline 15 and prevents the waste liquid 130 from leaking out.

In this embodiment, by removing the collection container 13 in the circulation assembly 30, the flow path of the waste liquid 130 can be reduced, thereby reducing the risk of leakage of the waste liquid 130 or volatilization of the solvent 101 in the waste liquid 130. Meanwhile, because collection container 13 is removed, the structure of the inkjet printing device 100 can be simplified, and the production cost can be reduced.

Further, the following embodiments of the present application will take the inkjet printing device 100 shown in FIG. 1 as examples to describe in detail the working state and non-working state of the inkjet printing device 100, but it cannot be understood as a limitation of the present application.

Figure 4:
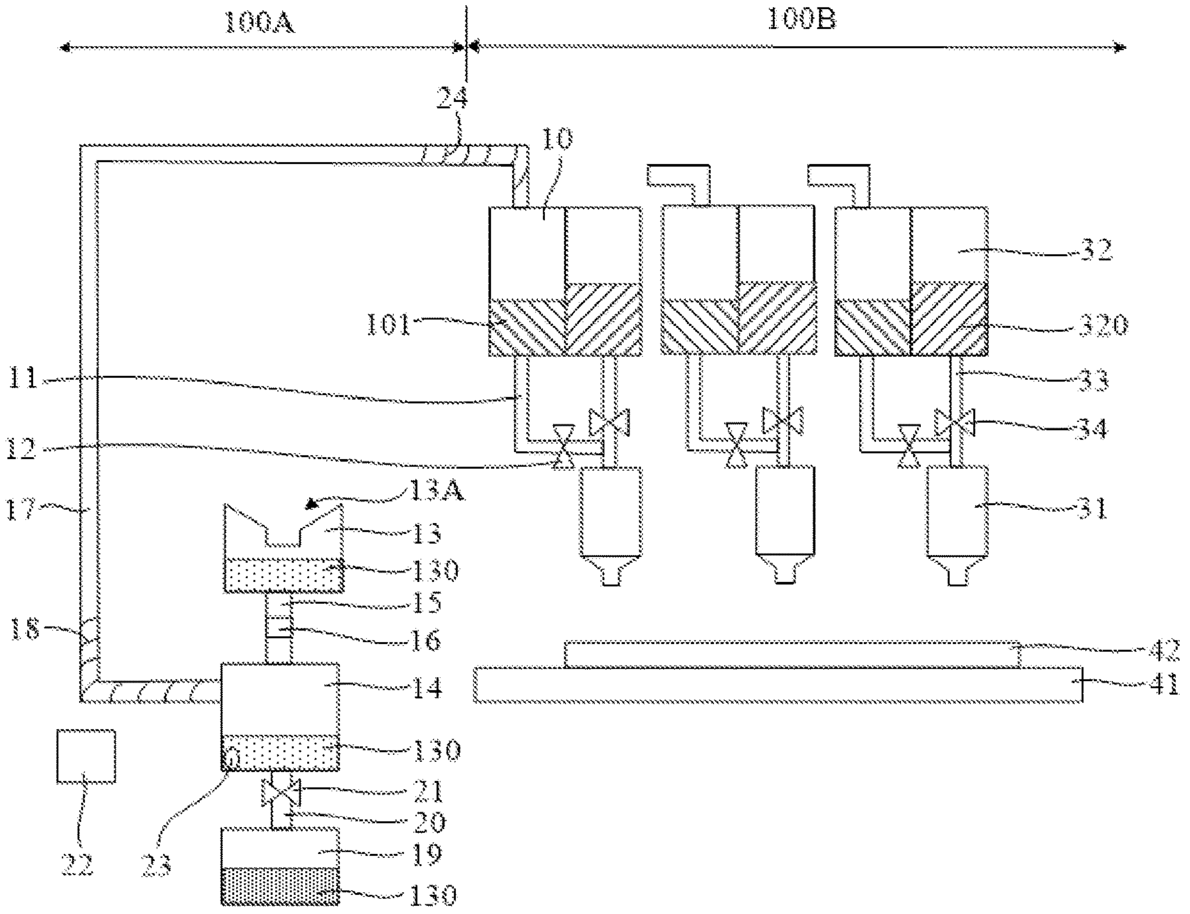
FIG. 4 is a schematic structural diagram of the inkjet printing device provided by the present application when it is in a working state.

Please refer to FIG. 4, which is a schematic structural diagram of the inkjet printing device provided by the present application when it is in a working state.

When the inkjet printing device 100 is in a working state, the second container 32, the second pipeline 33, and the print head 31 move from the cleaning area 100A to the printing area 100B. Because the first container 10 and the second container 32 are arranged side by side, the first container 10 and the first pipeline 11 will also move to the printing area 100B.

Wherein, the fourth pipeline 17 can be a telescopic pipeline. Thus, the movement of the second container 32, the second pipeline 33, and the print head 31 is satisfied.

Wherein, the printing area 100B is provided with a working base 41. The working base 41 is used to place the device 42 to be printed. The device to be printed 42 can be a substrate or a display device. The specific object to be printed can be determined according to actual needs. The inkjet printing device 100 moves above device 42 to be printed for performing inkjet printing on the device to be printed. When the inkjet printing device 100 starts printing, the first valve 12 is closed and the first pipeline 11 is disconnected. The second valve 34 is opened, and the second pipeline 33 is conducted. The printing material 320 flows into the print head 31 from the second container 32, and the corresponding film layer is printed on device 42 to be printed through the print head 31.

Optionally, during the inkjet printing process, the working base 41 can move in the first direction. The second container 32, the second pipe 33, and the print head 31 can move in the second direction. The first direction and the second direction are perpendicular to each other, so that film layer printing is achieved on device 42 to be printed.

It should be noted that when the inkjet printing device 100 is in the working state, the third container 14 can distill the waste liquid 130 therein to realize the separation and recycling of the solvent 101 and the printing material 320. The above two processes are independent of each other and are carried out at the same time, which can effectively improve work efficiency.

Figure 5:
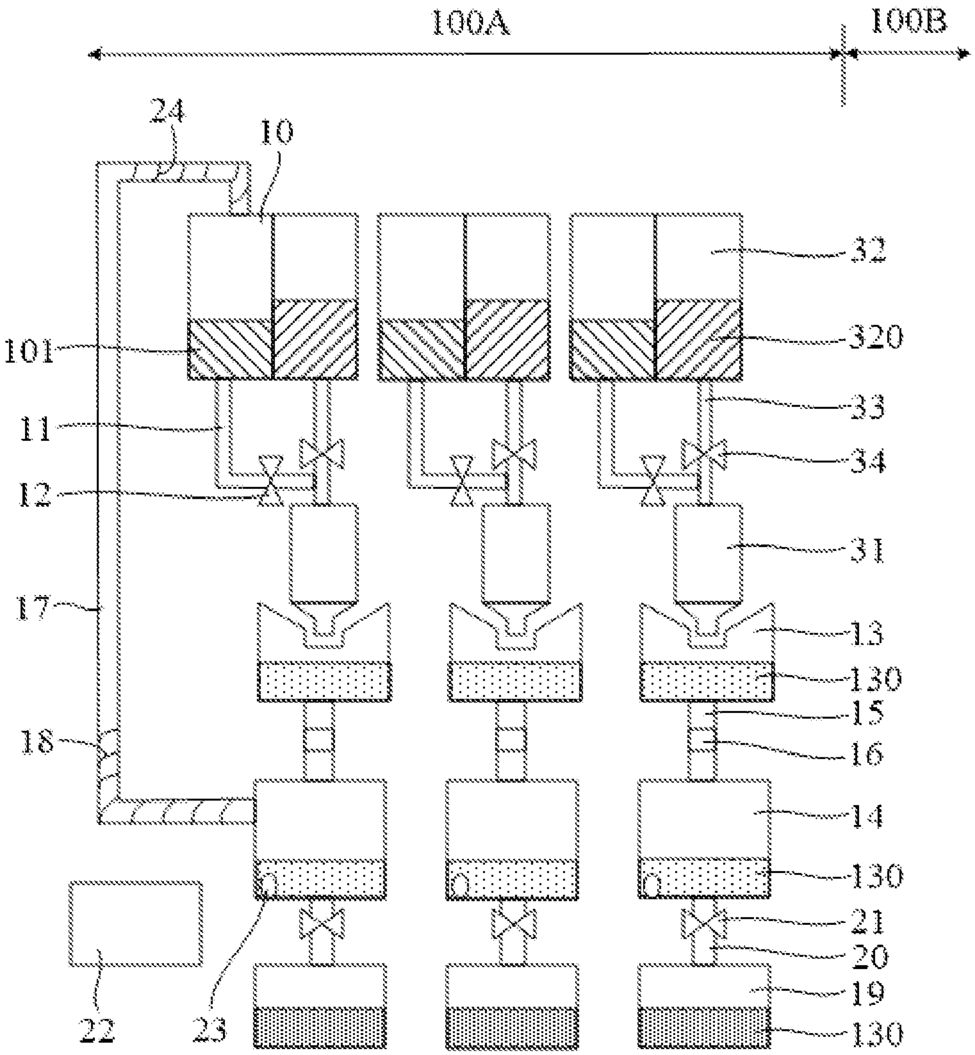
FIG. 5 is a schematic structural diagram of the inkjet printing device provided by the present application when it is in a non-working state.

Please refer to FIG. 5. FIG. 5 is a schematic structural diagram of the inkjet printing device provided by the present application when it is in a non-working state.

When the inkjet printing device 100 is in a non-working state, the second container 32, the second pipeline 33, and the print head 31 move from the printing area 100B to the cleaning area 100A. Similarly, the first container 10 and the first pipeline 11 will also move to the cleaning area 100A. In this situation, the second valve 34 is closed, and the second pipeline 33 is disconnected. The print head 31 no longer releases the printing material 320. The first valve 12 is opened, and the first pipeline 11 is conducted. The solvent 101 flows into the print head 31 from the first container 10 to clean the nozzle of the print head 31. The waste liquid 130 formed after washing flows into the third container 14 through the collection container 13 and the third pipeline 15. The third container distills the waste liquid 130 to evaporate the solvent 101. The evaporated solvent 101 flows into the first container 10 through the fourth pipeline 17 to realize the recycling of the solvent 101. As solvent 101 evaporates, the viscosity value of the waste liquid 130 in the third container 14 reaches the preset viscosity value and basically becomes the printing material 320, the fourth valve 21 is opened. The waste liquid 130 flows into the fourth container 19 through the fifth pipeline 20 to realize the recycling and utilization of the printing material 320.

It should be noted that when the inkjet printing device 100 is in a non-working state, the third container 14 can simultaneously perform distillation treatment on the solvent 101 in the waste liquid 130. The third container 14 can also evaporate the solvent 101 in the waste liquid 130 when the inkjet printing device 100 is in the working state. Alternately, when there is a lot of waste liquid 130, the third container 14 can perform distillation in both the non-working state and the working state.

In addition, the rotation switching mode of the inkjet printing device 100 provided in the present application between the working state and the non-working state is basically the same as the rotation switching mode of the current inkjet printing device adopting the auto spitting mode. Therefore, the specific rotating structure will not be repeated herein.

The present application provides an inkjet printing device 100, which is additionally provided with a first container 10, a first pipeline 11, and a first valve 12. When the inkjet printing device 100 is in a non-working state, the first valve 12 is opened to conduct the first pipeline 11. The solvent 101 flows into the print head 31 through the first pipe 11 to clean the nozzle of the print head 31, which can prevent the nozzle of the print head 31 from clogging and improve the utilization rate of the print head 31. Meanwhile, compared with the prior art, the printing material 320 is saved. Furthermore, by adding a circulation assembly 30 to the inkjet printing device 100, the solvent 101 and the printing material 320 can be recycled, thereby improving resource utilization and reducing costs.

The inkjet printing device provided by the present application is described in detail above, and specific examples are cited in this article to illustrate the principle and implementation of the present application. The description of the above embodiment is only used to help understand the method and core idea of this application. Meanwhile, for those of ordinary skill in the art, according to the idea of the present application, there will be changes in the specific implementation and the scope of application. As mentioned above, the content of this specification should not be construed as a limitation to the present application.

What is claimed is:

1. An inkjet printing device, comprising:

a print head configured to discharge printing material;

a first container configured to store a solvent for cleaning the print head;

a first pipeline, wherein an input end of the first pipeline is in communication with first container, and an output end of first pipeline is in communication with the print head;

a first valve provided on the first pipeline; and a circulation assembly configured to receive a waste liquid flowing out from the print head and to output the solvent and/or the printing material;

wherein the circulation assembly comprises a third container, a third pipeline, a third valve, and a fourth pipeline; and an input end of the third pipeline is configured to receive the waste liquid, an output end of the third pipeline is in communication with the third container; the third valve is provided on the third pipeline; the third container is arranged below the first container, the third container is configured to store the waste liquid and to evaporate the solvent in the waste liquid; an input end of the fourth pipeline is in communication with the third container, and an output end of the fourth pipeline is in communication with the first container;

wherein the fourth pipeline comprises an input section and an output section; and the circulation assembly further comprises a heating element and a condensing element, the heating element is arranged in the input section, and the condensing element is arranged in the output section.

2. The inkjet printing device according to claim 1, further comprising a second container, a second pipeline, and a second valve;

wherein the second container is configured to store the printing material, an input end of the second pipeline is in communication with the second container, and an output end of the second pipeline is in communication with the print head, and the second valve is provided on the second pipeline.

3. The inkjet printing device according to claim 2, wherein the inkjet printing device has a working state and a non-working state;

in the working state, the first valve is closed and the second valve is open, and in the non-working state, the first valve is open and the second valve is closed.

4. The inkjet printing device according to claim 2, wherein the output end of the first pipeline is in communication with a part of the second pipeline located between the second valve and the print head.

5. The inkjet printing device according to claim 2, wherein the first container and the second containers are arranged side by side.

6. The inkjet printing device according to claim 1, wherein the solvent is same as a solvent in the printing material.

7. The inkjet printing device according to claim 1, wherein the circulation assembly comprises a collection container for receiving the waste liquid.

8. The inkjet printing device according to claim 7, further comprising another print heads and another collection containers, wherein each of the print heads is configured to print one type of the printing material, and each of the collection containers is arranged corresponding to at least one of the print heads that print a same type of printing material.

9. The inkjet printing device according to claim 1, wherein the circulation assembly further comprises a fourth container, a fifth pipeline, and a fourth valve; and the fifth pipeline is in communication with the third container and the fourth container; the fourth valve is provided on the fifth pipeline; the fourth container is arranged below the third container, and the fourth container is configured to store the waste liquid after evaporating the solvent.

10. The inkjet printing device according to claim 9, further comprising a control unit;

wherein the control unit is respectively connected to the first valve, the second valve, and the fourth valve, and is configured to control opening or closing of the first valve, the second valve, and the fourth valve, respectively; or the control unit is respectively connected to the first valve, the second valve, the third valve, and the fourth valve, and is configured to control opening or closing of the first valve, the second valve, the third valve, and the fourth valve, respectively.

11. The inkjet printing device according to claim 10, further comprising a viscosity sensor provided on an inner sidewall or a bottom wall of the third container, and the viscosity sensor is connected to the control unit;

wherein the viscosity sensor is configured to obtain a viscosity value of a solution in the third container, and the control unit is configured to control the opening or closing of the fourth valve according to the viscosity value.

12. The inkjet printing device according to claim 1, wherein the circulation assembly further comprises a collection container for receiving the waste liquid, and the collection container is connected to the input end of the third pipeline.

13. The inkjet printing device according to claim 12, wherein the circulation assembly further comprises a fourth container, a fifth pipeline, and a fourth valve;

the fifth pipeline is in communication with the third container and the fourth container; the fourth valve is provided on the fifth pipeline; the fourth container is arranged below the third container, and the fourth container is configured to store the waste liquid after evaporating the solvent.

* * * * *